May 26, 1953 K. H. OTTE 2,639,827
PAN DUMPING DEVICE
Filed July 3, 1948 6 Sheets-Sheet 1

INVENTOR.
Karl H. Otte
BY Mann and Brown
Attys.

May 26, 1953 K. H. OTTE 2,639,827
PAN DUMPING DEVICE
Filed July 3, 1948 6 Sheets-Sheet 3

INVENTOR.
Karl H. Otte
By:- Mann and Brown
Attys.

May 26, 1953   K. H. OTTE   2,639,827
PAN DUMPING DEVICE
Filed July 3, 1948   6 Sheets-Sheet 4
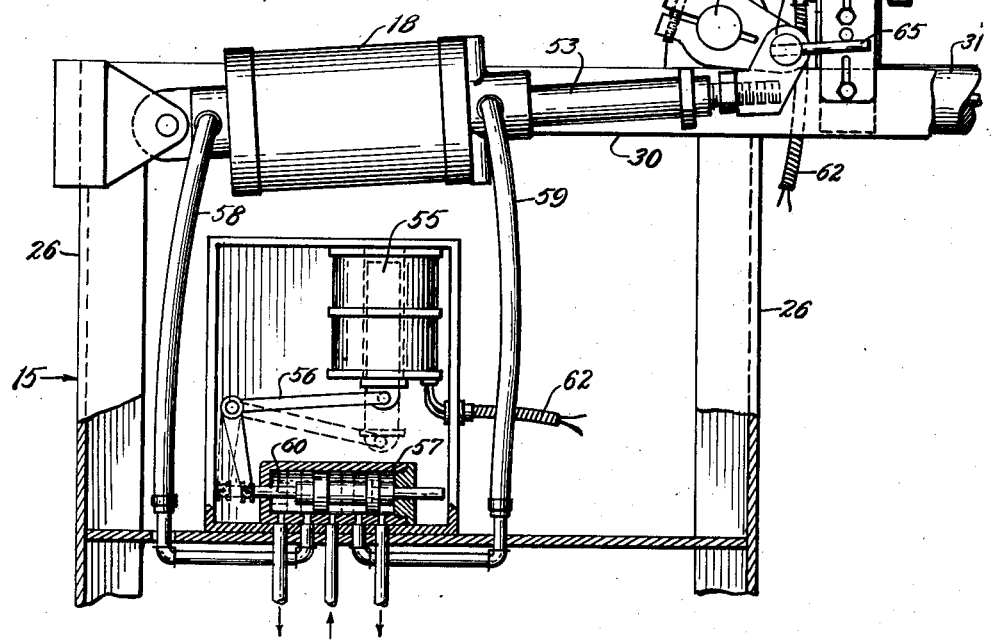
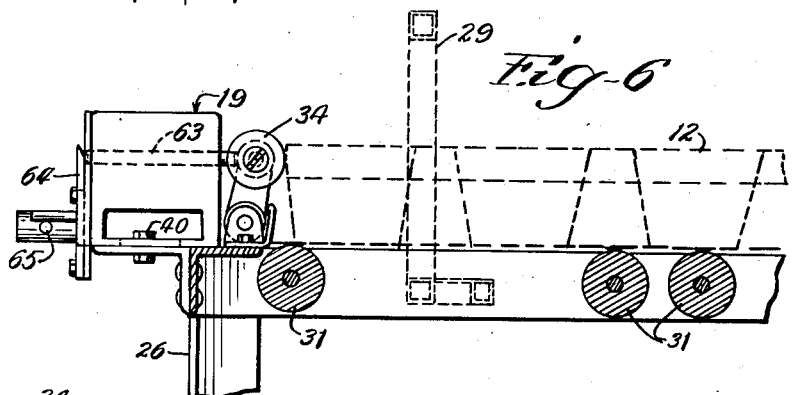
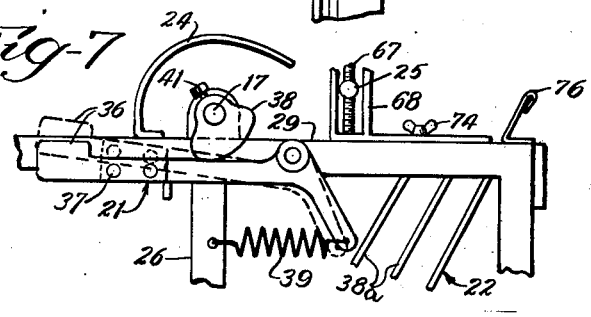
INVENTOR.
Karl H. Otte.
BY Mann and Brown
Attys.

May 26, 1953 K. H. OTTE 2,639,827
PAN DUMPING DEVICE
Filed July 3, 1948 6 Sheets-Sheet 5
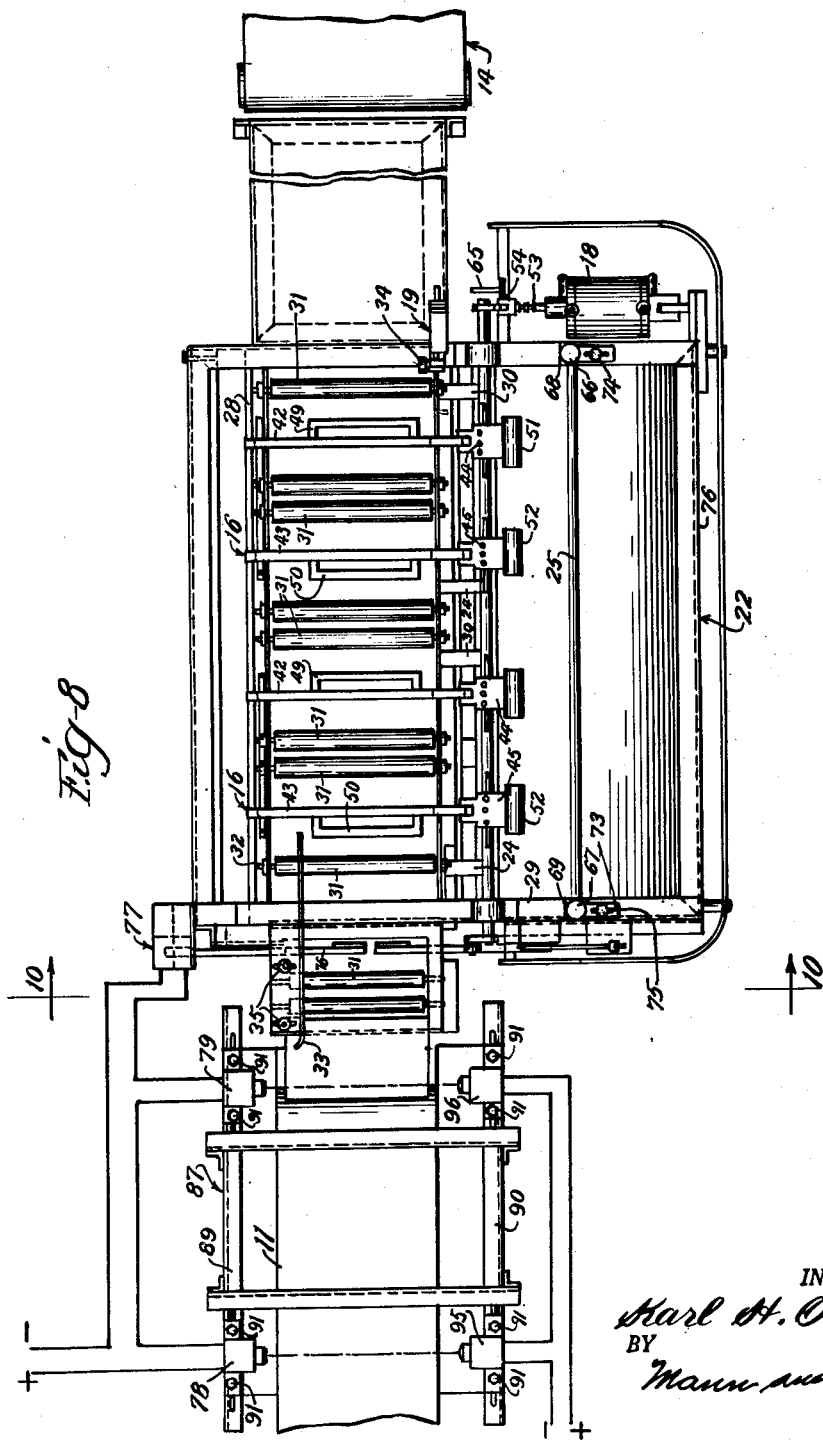
INVENTOR.
Karl H. Otte.
BY
Mann and Brown May 26, 1953 K. H. OTTE 2,639,827
PAN DUMPING DEVICE
Filed July 3, 1948 6 Sheets-Sheet 6
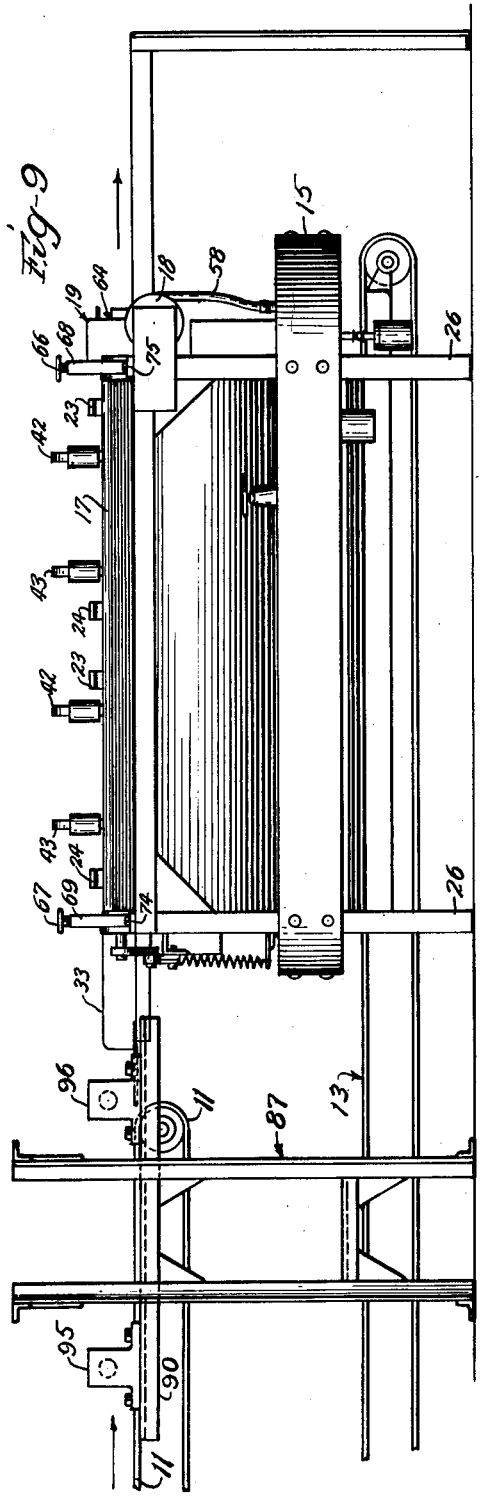
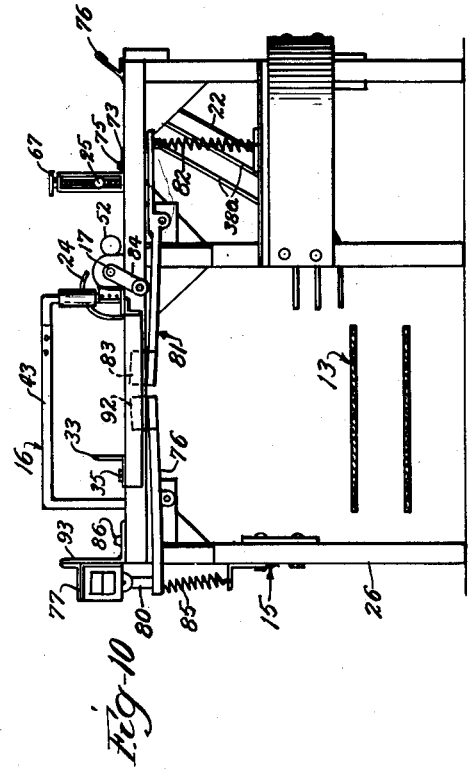
INVENTOR.
Karl H. Otte
BY Mann and Brown
Attys.

Patented May 26, 1953

2,639,827

UNITED STATES PATENT OFFICE 2,639,827

PAN DUMPING DEVICE

Karl H. Otte, Chicago, Ill., assignor to Purity Bakeries Service Corporation, a corporation of Illinois Application July 3, 1948, Serial No. 36,972

10 Claims. (Cl. 214—308)

1

This invention relates to the manufacture of bakery products, and is concerned specifically with the provision of a means for automatically extracting bread, and similar bakery goods, from baking pans.

An important operation in the manufacture of bread commercially is the removal of the bread from baking pans after their emergence from the baking oven. Such bread removal must be accomplished soon after the bread leaves the oven, in order to forestall sticking of the bread to the pans, and frequently requires performing this operation close to the baking ovens where the temperature is relatively high and working conditions, due to the heat of the oven as well as the temperature of the bread-containing pans, are far from satisfactory. As commonly performed in the industry, the hot bread filled pans are emptied manually by one or more workers who lift the pans, give them an impact shock to loosen the loaves, and then invert the pans to remove the bread. The performance of this operation not only entails the operator's working under very uncomfortable conditions, but is unsatisfactory for other reasons, such as the noise associated with shocking the pans, and the resulting damage to the pans caused by cumulative bending and warping.

One object of this invention is to provide a means for automatically extracting baked bread from baking pans.

Another object is to provide a means for rapidly and automatically separating baked bread from containers therefor.

A further object is to provide a device for automatically removing bread from baking pans and depositing the bread, right side up, on a conveyor belt.

Another object is to provide a device for removing bread from containers which is adaptable for handling loaves of various sizes and shapes.

The attainment of these and other objects will best be understood from the following detailed description and accompanying drawings in which:

Fig. 5 is a detail view, partly in section, of the frame-rotating mechanism shown in Fig. 3;

2

Figure 1:
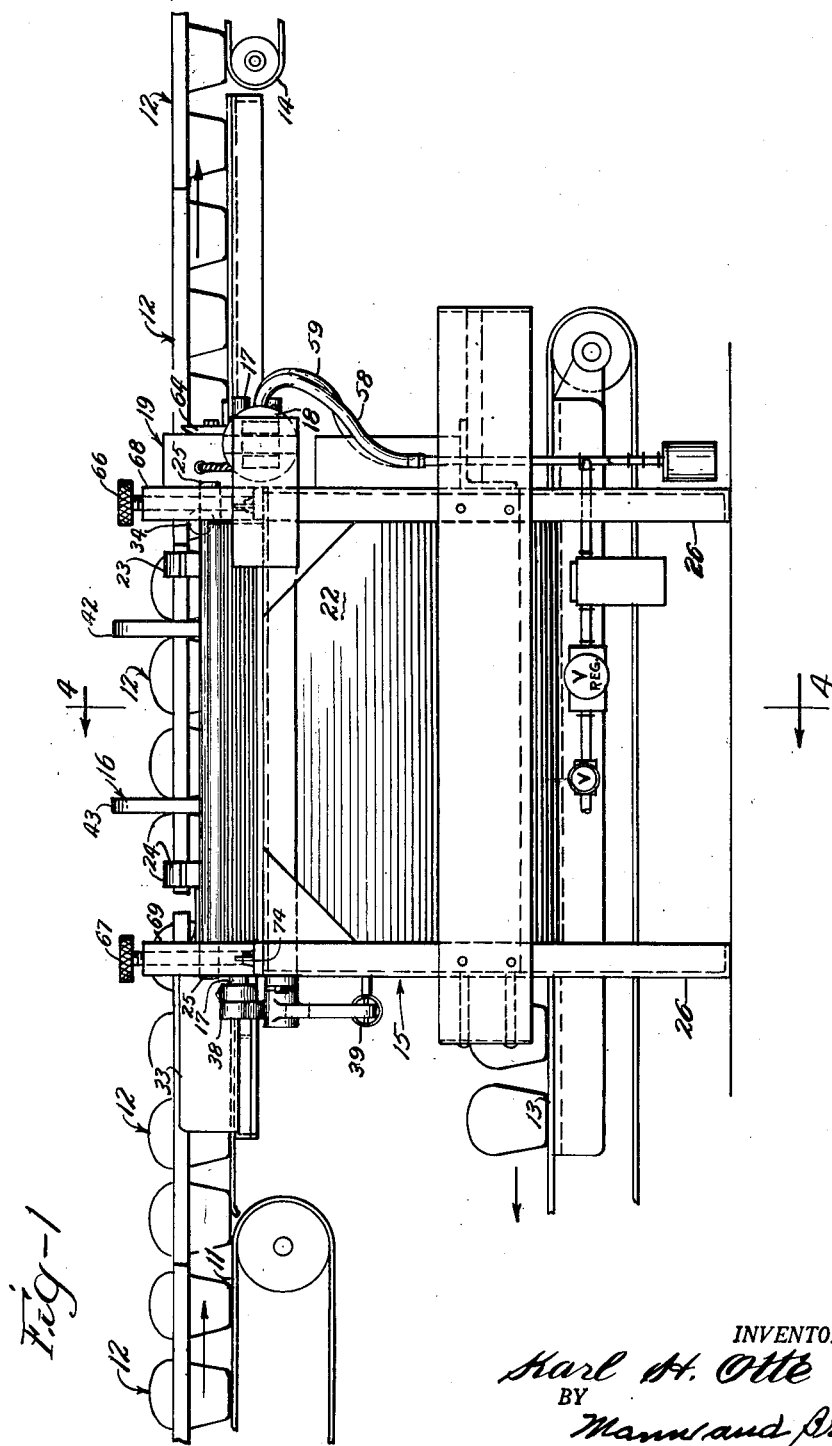
Fig. 1 is a side elevation of a pan dumping device embodying my invention.

Fig. 6 is a detail view of a portion of a switch mechanism which actuates the frame-rotating mechanism of Fig. 5, shown as the switch is being contacted by a set of baking pans;

Fig. 7 is a detail view of a latch mechanism which controls the feeding of pan sets into the rotatable frame;

Fig. 8 is a plan view of a modified form of my invention, and shows a device for simultaneously dumping two pan sets;

Fig. 9 is a side view of the device of Fig. 8; and

Fig. 10 is a view of the device of Fig. 8 along the line 10—10.

The particular embodiment of my invention shown in Figs. 1 through 7 of the drawings is adapted for use with an input conveyor belt 11, which delivers bread-filled pan sets 12 to the device, and output conveyor belts 13 and 14 which carry away loaves of bread and empty pan sets, respectively, from the device.

The pan dumping device itself consists, generally, of a support structure 15, a frame 16 mounted on the support structure 15 for rotation about a horizontal axis and adapted to receive pan sets 12 and carry them through a cycle of inverting movement; a rotatable, horizontal shaft 17 to which the frame 16 is secured; suitable means, such as a double-action pneumatic cylinder 18, for rotating shaft 17; a switch mechanism 19 for actuating the pneumatic cylinder 18; a latch element 21 for effecting controlled feeding of pan sets into the frame 16; a chute 22 for receiving ejected loaves of bread and directing them onto an output conveyor belt 13; turnover guides 23 and 24; and a turnover bar 25 for imparting a "somersault" movement to loaves of bread during the course of their ejection from the pans.

Figure 2:
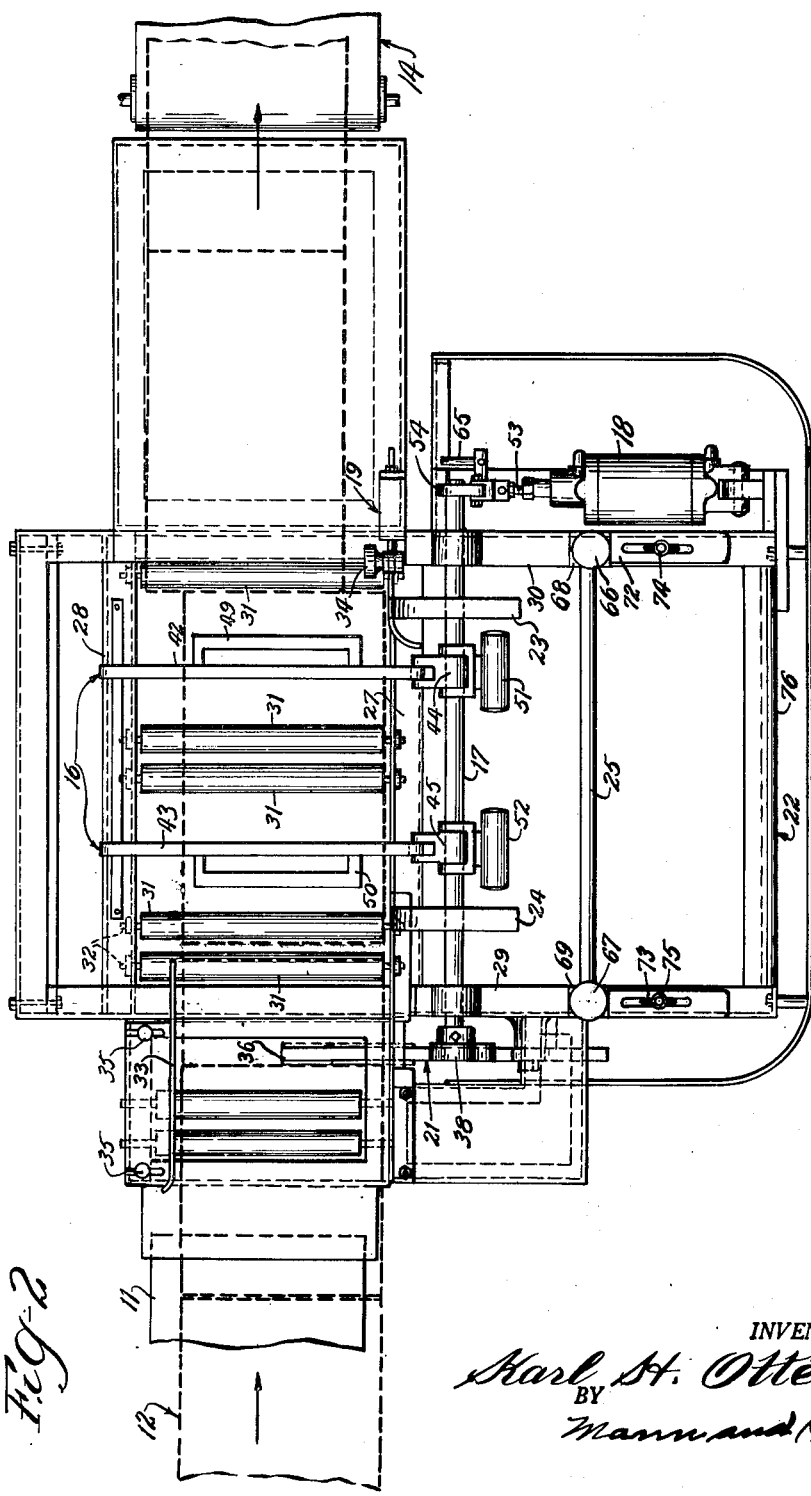
Fig. 2 is a plan view of the device shown in Fig. 1.

As shown, the support 15 has legs 26 and upper side members 27, 28, 29 and 30 forming the skeletal framework to which the component elements of the device are secured. Positioned between side members 27 and 28 are rollers 31, the ends of the rollers being supported by bearings 32 suitably secured thereto. Near the input side of the device is positioned an angle guide 33 which directs the incoming pan sets 12 so that their forward movement will cause the pan sets 12 to contact the bumper or roller 34 of the switch 19. In order to accommodate pans of different widths, the angle guide 33 is movably secured to the upper members of the support 15 by means of bolts 35, as shown in Fig. 2.

Likewise positioned near the input side of the device is a latch mechanism 21. As best shown in Fig. 7, the latch mechanism 21 is pivotally connected to a side member 29 of the support 15, and has one end connected to a leg 26 of the support 15 by means of a spring 39 (Fig. 7). The other end of the latch 21 extends vertically upward to form a tongue 36 which interrupts the forward movement of pan sets 12 in accordance with the rotation of shaft 17. The upwardly projecting tongue element 36 of the latch 21 is connected to the arm portion thereof by means of bolts 37, as shown, and may be replaced by one of different size to operate with pan sets of various sizes.

As also shown in Fig. 7, the upper portion of the latch arm 21 forms a riding surface for a cam 38 which is secured to the shaft 17 by a bolt 41. The purpose of the cam 38 is to control the upward and downward movement of the latch tongue 36, in accordance with the rotation of the shaft 17, and thereby control the forward movement of the incoming pan sets 12, as will be explained hereinafter.

Figure 3:
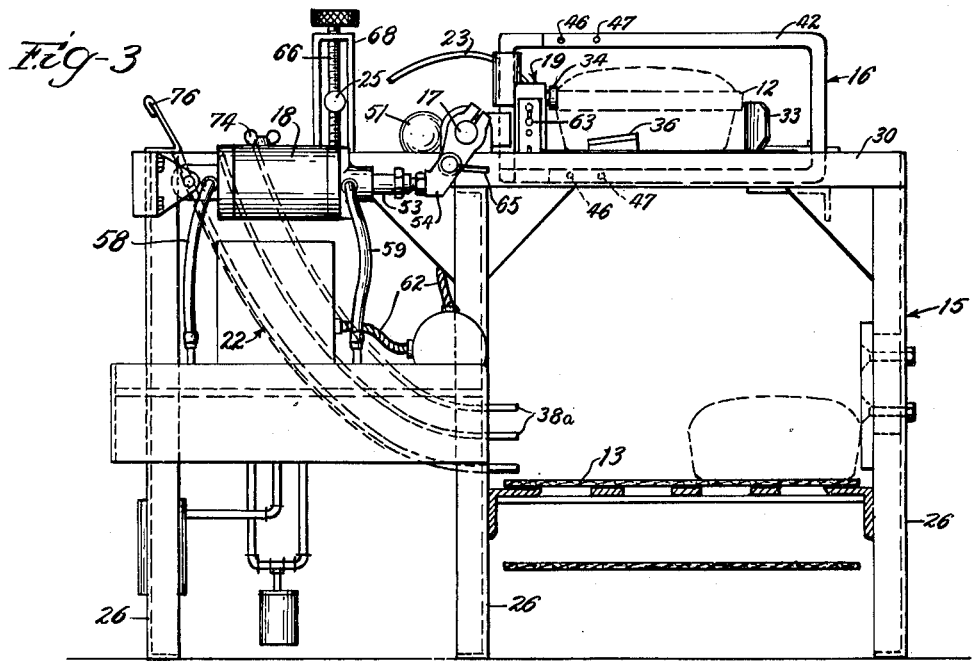
Fig. 3 is an end view of the device shown in Fig. 1 from the right.
Figure 4:
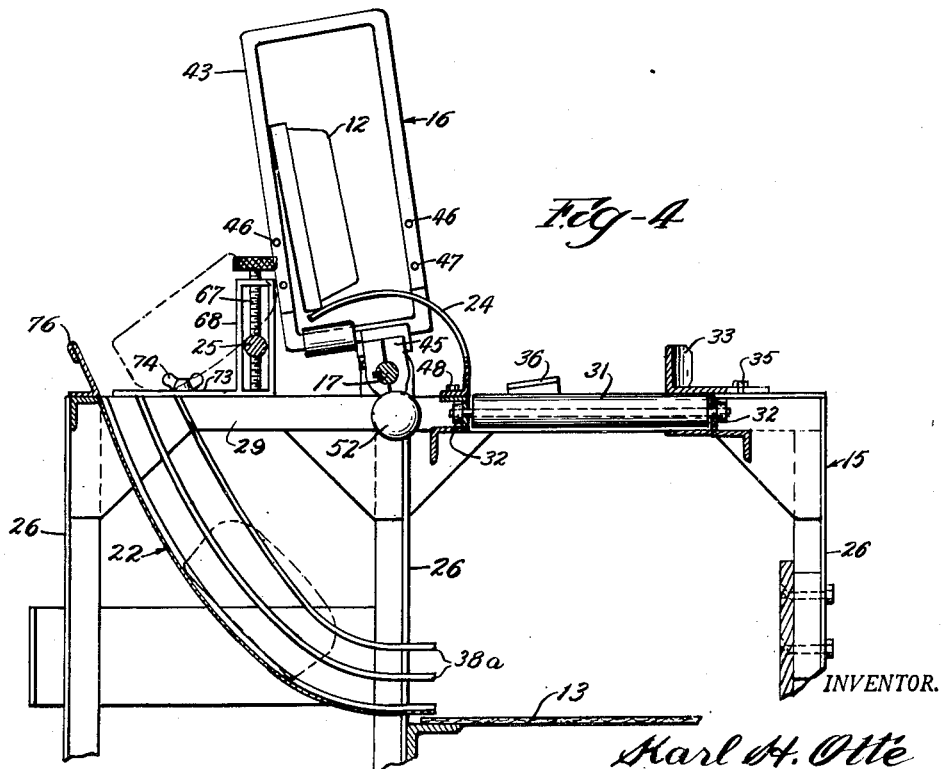
Fig. 4 is a view of part of the device of Fig. 1 along the line 4—4.

The rotatable frame 16, as shown in Figs. 1, 2, 3 and 4, consists of two end sections 42 and 43, each of which is fastened to the shaft 17 by means of shaft couplings 44 and 45. Each of these end members 42 and 43 is adjustable to accommodate baking pans of different widths, by means of set-screws 46 and 47 engaging telescopable portions of the aforesaid end sections 42 and 43, as shown in Figs. 3 and 4. Desirably the width and height of end members 42 and 43 is greater than the width and height of pans being received therein for reasons which will hereinafter be given. For increasing the contact surface of the end sections 42 and 43, there are provided wing members 49 and 50, formed of metal and rigidly secured to the lowermost members of the frame 16. Turnover guides 23 and 24 are rigidly secured to the side member 27 by means of bolts 48, and serve to provide an impact and guiding surface for the forward edge of a pan set 12 during its inversion by the frame 16.

Rigidly secured to the shaft couplings 44 and 45, which connect the frame 16 to shaft 17, are counterbalances 51 and 52 which serve to balance the weight of the frame 16 on shaft 17, as best shown in Fig. 2. Rotation of the frame 16 about the shaft 17 is accomplished by the reciprocal movement of the piston arm 53 of a pneumatic cylinder 18 pivotally secured to the frame 15, acting through a crank arm 54 (best shown in Figs. 3, 4 and 5), which connects arm 53 with the shaft 17.

Fig. 5 shows in detail the construction of the pneumatic apparatus comprising cylinder 18 operatively connected to solenoid valve 55 through the pivoted elbow element 56, cylinder 57, and air conduits 58 and 59. The solenoid 55 is connected to switch 19 by electrical conduits 62.

Cylinder 18, as illustrated, is of a type such as the Model K cylinder, 3" grip, 4½" stroke, cushioned at both ends, manufactured by the Anker-Holth Mfg. Co., 2743 Connors St., Port Huron, Michigan.

The solenoid valve unit 55 is of a type such as the single plunger, single solenoid valve #2523½ S. A. 4, Q. A. W., manufactured by C. B. Hunt & Son, Inc., 1870 E. Pershing St., Salem, Ohio.

The switch mechanism 19 may be of the type known as the #9007 L. D. 5 Square D limit switch, manufactured by the Square D Company, 6060 Rivard St., Detroit 11, Michigan. The switch 19 operates the solenoid valve 55, and has a roller trip 63 with a spring return actuated by a wedge 64 and a lifting finger 65 on the crank arm 54, the switch 19 being movably secured to the support 15 by a bolt 40 to permit adjustment of its position for various pan sizes.

Secured to the upper members of support structure 15 is a turnover bar 25, best shown in Figs. 3 and 4. The end portions of the turnover bar 25 are threadably connected to knurled head screw members 66 and 67, the screw members being fixedly positioned within housings 68 and 69. The housings 68 and 69 are rigidly secured to slotted bars 72 and 73, respectively, and the bars movably connected to the upper support members 29 and 30 by means of wing nuts 74 and 75, whereby to permit increasing or decreasing the distance between the turnover bar 25 and shaft 17. Thus it is seen that the turnover bar 25 is movable both horizontally and vertically.

A bread chute 22, having side guides 38ª suitably secured to the support 15, is positioned below the turnover bar 25, as shown in Figs. 3 and 4, suitably secured to the support 15, terminates generally below the rotating frame 16 and rollers 31, and serves to deposit discharged loaves of bread onto a moving conveyor 13. A guard member 76 is preferably secured to the legs 26 of the support 15 (as shown in Fig. 4) for assisting in the interception of loaves of bread upon discharge from the pans.

In operation, bread filled pan sets 12, each consisting, for example, of four pans, enter the device, as shown in Figs. 1 and 2, from a conveyor belt 11, and are guided by means of the angle guide 33 so that one edge of the pan sets is in close proximity to the ends of the rollers 31 closest to the rotating shaft 17. A pan set 12 moves forward on the rollers 31 until the forward edge of the pan strikes the roller 34 of the switch mechanism 19. The roller 34 thereupon moves forward and actuates the switch mechanism 19, which results in de-energizing the solenoid valve 55, which causes the elbow member 56 to move to the position shown in dotted lines in Fig. 5, whereupon air enters cylinder 57, passes through a conduit 58 into cylinder 18, and pushes the arm 53 of cylinder 18 forward. This movement results in rotating the shaft 17 and simultaneously tilting the frame 16 to the position shown in Fig. 4. The rotating movement of the frame 16 causes the pan set 12 to first drop against turn-over guides 23 and 24, and then, as the rotation is continued, to slide against the upper portion of the frame 16 whereby to impart an additional shock to the pan set 12. This loosens the bread in the pans, the loaves leave the pans, the lower portions of the loaves strike the turnover bar 25, the loaves perform a "somersault" and drop right side up onto the chute 22. From the chute the loaves slide onto the bread conveyor 13.

As soon as frame 16 reaches the position shown in Fig. 4, the finger 65 on crank arm 54 pushes the wedge 64 upwardly against the trip 63 of switch 19. This results in closing the circuit, actuating the solenoid valve 55, and causes elbow 56 to move to the position shown in solid lines in Fig. 5, which moves the piston element 60 in cylinder 57 to the right, cuts off air flow through conduit 58, and forces air into the opposite end of cylinder 18 through conduit 59. This moves arm 53 to the left and results in rotating shaft 17 back to its original position. The latter movement of the frame 16 causes the empty pan set 12 contained therein to slide outwardly, due to centrifugal force, so that on return of the frame 16 to its original position the pan set is resting against the outermost ends of the frame 16, i. e., the ends farthest from shaft 17, there being, consequently, no contact between the returned pan set 12 and the switch roller 34.

Simultaneously with the inverting movement of the frame 16, the latch mechanism 21 moves to the position shown in dotted lines in Fig. 7, and the interposition of the latch tongue 36 upwardly between the rollers 31 (as shown in Fig. 3) prevents the inward movement of subsequent pan sets. The return movement of the frame 16 simultaneously causes a lowering of the latch tongue 36, which is so synchronized with the movement of the frame 16 that the positioning of the frame 16, as shown in Fig. 3, results in an incoming full pan set 12 pushing the emptied pan set out of the frame onto a belt conveyor 14, as shown in Fig. 2.

Figs. 8 to 10 inclusive illustrate a modified form of my device adapted for simultaneously dumping two pan sets. As shown in the drawings the device employs two rotating frames 16 which receive and simultaneously invert two bread-containing pan sets 12. To control and properly synchronize the rotation of the frames 16 there is provided a latch 76 whose movement is controlled by a solenoid 77, operatively connected to two photoelectric cells 78 and 79. The latch 76 acts, together with a second latch 81, to insure the entrance of two full pan sets into the receiving frames 16.

As shown in Fig. 10, the latch 81 is pivotally connected to the frame 15. One end of the latch 81 is connected to a spring 82, the spring being rigidly fastened to the frame 15 as shown; the other end of the latch 81 is provided with an upwardly projecting tongue 83 which is movable vertically between the rolls 31 at the pan-receiving end of the device, as shown in Fig. 8. The upper portion of the latch 81 provides a riding surface for a crank arm 84 which is rigidly secured to shaft 17. When the rotating frame 16 is in pan-receiving position, as shown in Fig. 10, the spring 82 is under tension, and the pressure of crank arm 84 on the riding surface of latch 81 maintains the latch tongue 83 below the surface of the rolls 31. Rotation of shaft 17 clockwise moves the crank arm 84 clockwise, whereupon the tension of spring 82 moves latch tongue 83 into pan-detaining position above the rolls 31. Thus it is seen that pan sets 12 can enter the device only when the frames 16 and latch tongue 83 are in the positions shown in Fig. 10.

The latch 76 is likewise pivotally secured to the frame 15 and connected at one end to spring 85, the spring being secured to the leg 26, as shown in Fig. 10. This spring connected end of the latch 76 is operatively connected to a solenoid 77 by means of a connecting arm 80, whereby activation of the solenoid 77 moves the connecting arm 80 upwardly and results in depressing the latch tongue 92 sufficiently to permit the passage of pan sets thereover. The solenoid 77 is mounted on the supporting structure 15 by means of a plate 93, secured to the framework 15 by bolts 86.

The photoelectric cells 78 and 79 are mounted on a side member 89 of framework 87, supported by legs 88. The cells 78 and 79 are movably secured to side member 89 of the supporting structure 87 by means of bolts 91 which pass through slots in the side member, which arrangement permits moving the photoelectric cells 78 and 79 longitudinally, for cooperation with different sizes of pan sets. The photoelectric cells 78 and 79 are connected in series to a current source and to the solenoid 77, as shown in Fig. 8, and are set so that the latch 76 holds back full pan sets until a pan stops in front of each photoelectric cell. The cells 78 and 79 are operatively connected to two light sources 95 and 96, each adapted to throw a beam of light to the oppositely positioned photoelectric cell. The lamps 95 and 96 are mounted on side member 90 of frame 87 in the same manner as the photocells 78 and 79, and connected to a suitable source of current.

In operation bread-containing pan sets 12 move forward on the conveyor belt 11 until the light beam between both of the photoelectric cells 78 and 79 is interrupted by a pan. When this occurs the solenoid 77, which may be controlled through a relay, not shown, becomes activated and pulls the spring-connected end of the latch 76 upwardly, which results in latch tongue 92 moving below its pan-detaining position. Two bread-containing pan sets are then pushed into the rotating frames 16. The leading full pan set trips the limit switch 34, which results in rotating the frames 16, as hereinbefore described.

The particular form of my invention shown in Figs. 8 through 10 is especially suitable for use with an input conveyor belt delivering bread-filled pan sets at a relatively high rate of speed, for example, twenty sets per minute. In order to accommodate pan sets at such a rate, the single pan device described in Figs. 1 through 7 would have to perform twenty pan-inverting operations per minute. This results, frequently, in imparting a "sling shot" effect to the ejected loaves, which may damage the loaves.

By using the modified form of my invention, shown in Figs. 8 through 10, which is adapted to receive and dump two pan sets during each cycle of operation, it is seen that only ten pan-inverting operations per minute are required to accommodate an input conveyor belt delivering twenty pan sets per minute. Such a slower rate of operation not only is less damaging to the ejected loaves, but is less noisome.

It is understood, of course, that the device of my invention may be modified to receive and dump an even larger number of pan sets per cycle of operation, and may consequently operate at an even slower rate. It is also understood that while I have described a means of controlling the number of pan sets which are delivered to the device for one inverting operation, by a means including photoelectric cells, this control may be accomplished in other ways, as will be evident to those skilled in the art.

The device of my invention, in its several forms, permits the automatic removal of bread from baking pans rapidly and efficiently, and is well adapted for use with other automatic machinery in a bakery production line. Among the novel and important features of my invention is the provision for imparting a plurality of shocks to the bread-containing pan sets in order to more efficiently loosen the loaves. Another feature is the unique means for centrifugally positioning emptied pan sets in the rotating frame in order to return the pan sets to the bed of the device, so that the pan sets are out of contact with the switch roller.

Other advantages associated with my novel device are a substantial decrease in pan damage, and the simple adjustability of components of the device to accommodate pans and loaves of varying size and weight.

I claim as my invention:

1. In a device for removing bread loaves from baking pans, the combination of a support, a delivery conveyor for moving loaded pans in a forward direction to said support, an open frame mounted adjacent to the support on a horizontal axis substantially parallel to said direction of movement and having its bottom wall normally positioned below the plane of said support whereby loaded pans are moved by said delivery conveyor onto said support and within the confines of said frame, means for rotating the frame in one direction about said axis to at least partially invert the pan within the frame and in the opposite direction to return the emptied pan to the support, said frame having a vertical dimension sufficient to provide a substantial clearance between the top of the pan and the top of the frame whereby when said frame is rotated in said one direction it falls by gravity against the top of the frame to impart to the pan an impact which jars the bread loose from the pan, and a receiver for the ejected bread loaves.

2. In a device for removing bread loaves from baking pans, the combination of a support, a delivery conveyor for moving loaded pans in a forward direction to said support, means for laterally biasing the pans toward one side of the support, an open frame mounted adjacent to the support on a horizontal axis substantially parallel to said direction of movement and having its bottom wall normally positioned below the plane of said support whereby loaded pans are moved by said delivery conveyor onto said support and within the confines of said frame, means for rotating the frame in one direction about said axis to at least partially invert the pan within the frame, control means actuated by movement of a pan onto the support for operating said frame-rotating means, said control means including a trip located adjacent the side of the support toward which the pans are biased, said frame having a vertical and lateral dimension sufficient to provide a substantial clearance between the top and side of the pan with respect to the frame whereby when said frame is rotated in said one direction it falls by gravity against the top of the frame to impart to the pan an impact which jars the bread loose from the pan, said frame rotating means also rotating the frame in the opposite direction to return the emptied pan to the support and to laterally displace the emptied pans away from the side of the support upon which said trip is located, whereby the emptied pans may be removed from said support by oncoming loaded pans to the support without operating said trip, and a receiver for the ejected bread loaves.

3. In a device for removing bread loaves from baking pans, the combination of a support, a delivery conveyor for moving loaded pans in a forward direction to said support, means for laterally biasing the pans toward one side of the support, an open frame mounted adjacent to the support on a horizontal axis substantially parallel to said direction of movement and having its bottom wall normally positioned below the plane of said support whereby loaded pans are moved by said delivery conveyor onto said support and within the confines of said frame, means for rotating the frame in one direction about said axis to at least partially invert the pan within the frame, control means actuated by movement of a pan onto the support for operating said frame-rotating means, said control means including a trip located adjacent the side of the support toward which the pans are biased, said frame having a vertical and side dimension sufficient to provide a substantial clearance between the top and side of the pan with respect to the frame whereby when said frame is rotated in said one direction it falls by gravity against the top of the frame to impart to the pan an impact which jars the bread loose from the pan, said frame rotating means also rotating the frame in the opposite direction to return the emptied pan to the support and to laterally displace the emptied pans away from the side of the support upon which said trip is located, whereby the emptied pans may be removed from said support by oncoming loaded pans to the support without operating said trip, means for limiting the number of pans permitted on the support at one time, said means including a stop interposed in the line of movement of succeeding pans, and a receiver for the ejected bread loaves.

4. In a device for removing bread loaves from baking pans, the combination of a support, a delivery conveyor for moving loaded pans in a forward direction to said support, an open frame mounted adjacent to the support on a horizontal axis substantially parallel to said direction of movement and having its bottom wall normally positioned below the plane of said support whereby loaded pans are moved by said delivery conveyor onto said support and within the confines of said frame, means for rotating the frame in one direction about said axis to at least partially invert the pan within the frame, said frame having a vertical dimension sufficient to provide a substantial clearance between the top of the pan and the top of the frame whereby when said frame is rotated in said one direction it falls by gravity against the top of the frame to impart to the pan an impact which jars the bread loose from the pan, said frame rotating means also rotating the frame in the opposite direction to return the emptied pan to the support, a receiver for the ejected bread loaves, and a turnover bar interposed before the receiver in the path of the falling loaves to right the loaves before reaching the receiver.

5. In a device for removing bread loaves from baking pans, the combination of a support, a delivery conveyor for moving loaded pans in a forward direction to said support, an open frame mounted adjacent to the support on a horizontal axis substantially parallel to said direction of movement and having its bottom wall normally positioned below the plane of said support whereby loaded pans are moved by said delivery conveyor onto said support and within the confines of said frame, means for rotating the frame in one direction about said axis to at least partially invert the pan within the frame, said frame having a vertical and lateral dimension sufficient to provide a substantial clearance between the top and side of the pan with respect to the frame whereby when said frame is rotated in said one direction it falls by gravity against the top of the frame to impart to the pan an impact which jars the bread loose from the pan, an arcuate guide engaging the pans during movement of the frame to fix their lateral position within the frame, said frame rotating means also rotating the frame in the opposite direction to return the emptied pan to the support, and a receiver for the ejected bread loaves.

6. In a device as set forth in claim 1, the combination therewith of contact means responsive to movement of pans into the frame for actuating said frame rotating means in said one direction.

7. A device as set forth in claim 1, in which the frame, in addition to having a vertical dimension sufficient to provide clearance between the top of the pan and the top of the frame, also has a lateral dimension greater than the width of the pan, whereby as the frame starts to rotate, the pan is first moved laterally within the frame by gravity and brought to a sudden stop and then, as the rotation of the frame continues, the pan falls by gravity against the top of the frame to provide a second sudden stop of movement of the pan, said sudden stops causing the contents of the pan to be effectively discharged when the pan is in said at least partially inverted position.

8. In a device as set forth in claim 1, the combination therewith of means for preventing delivery of pan sets from the conveyor to said support until the frame is in its normal retracted position.

9. A device for extracting bread from baking pans comprising a support across which the loaded pans move in a forward direction, an open frame having top and side portions mounted on the support for rotation about a horizontal axis parallel to said forward direction and adapted to receive within its confines and with substantial side and top clearance, a set of bread containing pans, means for rotating the frame in a direction to at least partially invert the pans and subjecting the pans during such rotation to translatory movement within the frame followed by a sudden stop to thereby jar the bread from the pans and cause it to fall therefrom, said rotating means also moving the frame in the opposite direction to return the empty pans to the support.

10. In a device as set forth in claim 9, the combination therewith of means for controlling the trajectory of the bread as it leaves the pans thereby to deposit said bread on a surface in upright position.

KARL H. OTTE.

References Cited in the file of this patent

UNITED STATES PATENTS

| Number | Name | Date |
|---|---|---|
| 1,283,090 | Cox | Oct. 29, 1918 |
| 1,462,468 | Schaller | July 17, 1923 |
| 1,473,996 | McGarry | Nov. 3, 1923 |
| 1,561,664 | Rathwell | Nov. 17, 1925 |
| 1,700,944 | Loew | Feb. 5, 1929 |
| 1,967,719 | Morgan | July 24, 1934 |
| 2,344,664 | Adams | Mar. 21, 1944 |
| 2,462,021 | Harker | Feb. 15, 1949 |
| 2,524,656 | Eyster | Oct. 3, 1950 |